United States Patent [19]

Hammer et al.

[11] Patent Number: 4,853,779

[45] Date of Patent: Aug. 1, 1989

[54] METHOD FOR DATA REDUCTION OF DIGITAL IMAGE SEQUENCES

[75] Inventors: Bernard Hammer, Pfaffing; Achim von Brandt, Munich, both of Fed. Rep. of Germany

[73] Assignee: Siemens Aktiengesellschaft, Berlin and Munich, Fed. Rep. of Germany

[21] Appl. No.: 178,567

[22] Filed: Apr. 7, 1988

[30] Foreign Application Priority Data

Apr. 7, 1987 [DE] Fed. Rep. of Germany ....... 3711627

[51] Int. Cl.$^4$ ............................................. H04N 7/12
[52] U.S. Cl. .................................... 358/133; 358/135
[58] Field of Search ........................ 358/133, 135, 136

[56] References Cited

U.S. PATENT DOCUMENTS

| | | | |
|---|---|---|---|
| 4,222,076 | 9/1980 | Knowlton | 358/133 X |
| 4,672,441 | 6/1987 | Hoelzlwimmer et al. | 358/135 |
| 4,710,812 | 12/1987 | Murakami et al. | 358/136 |
| 4,755,878 | 7/1988 | Nakayama et al. | 358/136 |
| 4,771,331 | 9/1988 | Bierling et al. | 358/135 X |

OTHER PUBLICATIONS

"64KB/S Integrated visual Telecommunication System", Conference Pub. 265, pp. 200-204.
"Vector Quantization of Color Images", IEEE 1986, pp. 133-136.
IEEE Transactions on Computers, vol. C-28, No. 11, "Progressive Refinement of Rastor Images", Nov. 1979.

Primary Examiner—Howard W. Britton
Assistant Examiner—Victor R. Kostak
Attorney, Agent, or Firm—Hill, Van Santen, Steadman & Simpson

[57] ABSTRACT

A method for data reduction of digital image sequences in heirarchic fashion by means of a multi-stage coder on the basis of vector quantizing and movement compensation, as well as reconstruction of these image sequences by means of a multi-stage decoder. An input image signal is represented in a plurality of image signals having different spatial resolutions by means of a cascade of L identical low-pass filters having subsequent sub-scanning, whereby the spatial resolution and the data volume of the input image signal in the horizontal and the vertical directions are respectively reduced by a factor R in every cascade stage, and whereby the input signal is referenced "resolution level L" and the low-pass filter image signal having the smallest resolution is referenced "resolution level $\emptyset$". The chronologically preceding, reconstructed, movement-compensated image signal is represented in a plurality of image signals having different topical resolution in the same way. The samples of the resolution levels are subdivided into blocks, whereby the "resolution level $\emptyset$" has the block size "1×1" and, for the next, the block size is horizontally and vertically increased by the factor R with every further resolution level but a block assumes the maximum block size N×N.

9 Claims, 10 Drawing Sheets

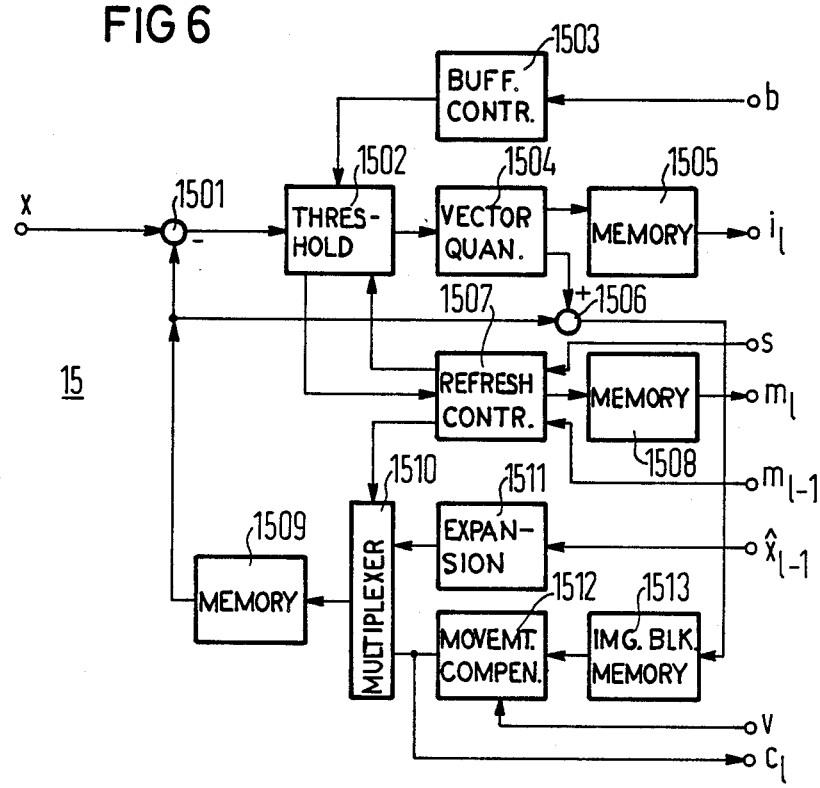
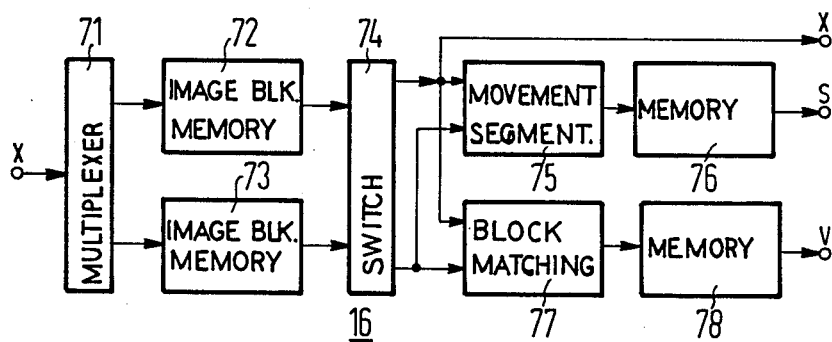

1   $A(e_{i,o}) < VTH$
2   $A(e_{i,1}) < VTH$ (flat area)
3   $VTH < A(e_{i,1}) > BTH$
    (VQ of $e_{i,1}$)
(4) $VTH \quad A(e_{i,1}) < BTH$ 5   unmoved area
(6) unmoved area, 1p filtered VTH: visual threshold
BTH: buffer control thresh.
e  : prediction error
$e_{i,k} = x_i - \text{expand}(\hat{x}_{i-k})$
A( ): activity index
$A(e_{i,k}) = \max_i(e_{i,k}) - \min_i(e_{i,k})$ ( ) used for coder control only

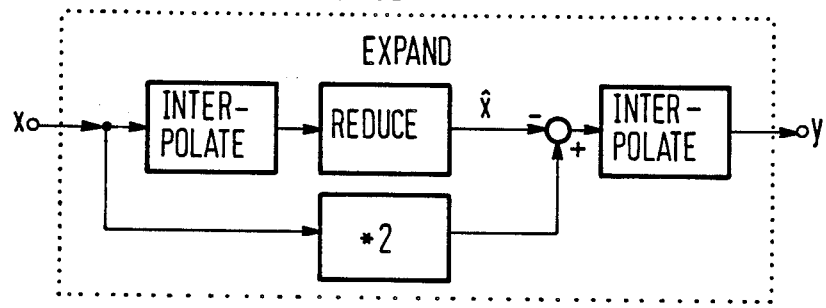
FIG 15
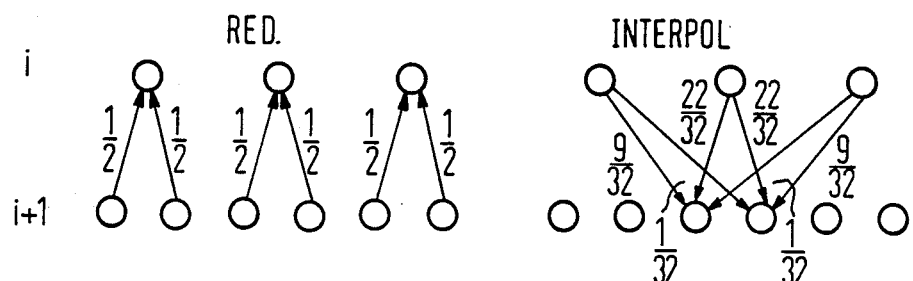
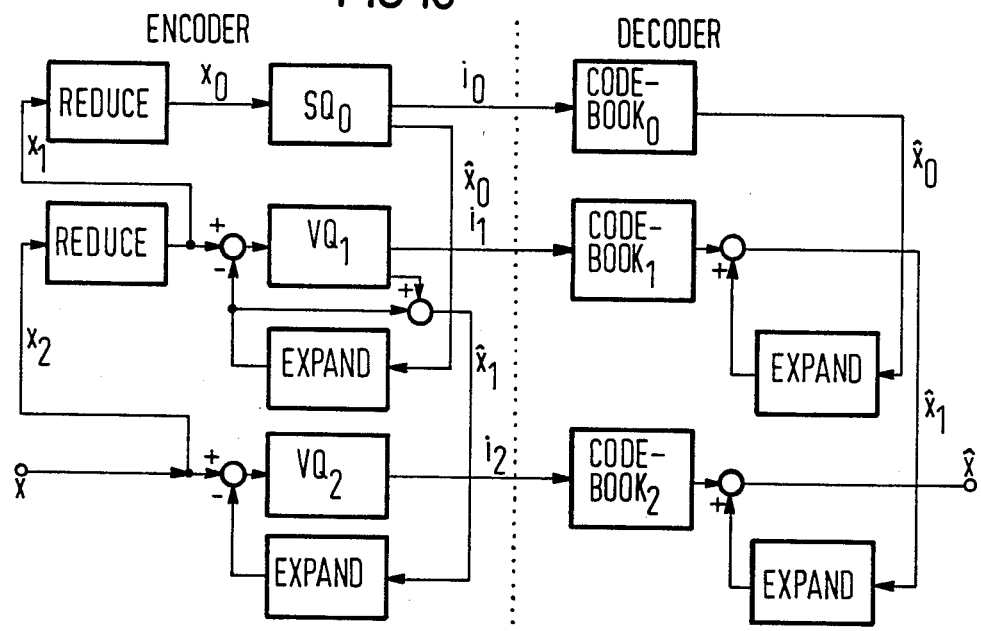
FIG 16

METHOD FOR DATA REDUCTION OF DIGITAL IMAGE SEQUENCES

BACKGROUND OF THE INVENTION

The present invention is directed to a method for data reduction of digital image sequences in hierarchic fashion by means of a multi-stage coder, using vector quantization and movement compensation as well as reconstruction of these image sequences by means of a multi-stage decoder.

Various methods for adaptive interframe vector quantizing having vector dimensions from 3 through 24 are known, cf. Conference Publication No. 265, pages 200–204, KDD Research and Development Laboratories, Japan, H. Yamaguchi, M. Wada, H. Yamamoto, "64 KB/S INTEGRATED VISUAL TELECOMMUNICATION SYSTEM" or, respectively, ICASSP 86, Tokyo, ANNEX F, pages 133 through 136, Mitsubishi Electric Corporation, Tokumichi Murakami, Kohtaro Asai, Atsushi Itoh, "VECTOR QUANTIZATION OF COLOR IMAGES", wherein the luminance components and color components are quantized in closed fashion. In order to increase the data reduction, the image-to-image differences are reduced by movement compensation (block matching methods) and background prediction (KDD).

These known methods resolve an image of an image sequence into relatively small blocks of 1×1 (KDD) or, respectively, 4×4 picture elements (Mitsubishi) that are processed independently of one another. Although the data reduction of a vector quantizing (VQ) can be increased by increasing the block size, disadvantages result, such as an exponential increase the complexity of the required calculations, as well as a poorer matching to the image data.

SUMMARY OF THE INVENTION

The object of the present invention is to create a method of the species initially cited 1 by means of which an effective data reduction can be carried out, whereby no disturbing block artifacts appear in the reconstructed image, particularly in the case of images having a high movement component, and with which method larger areas of the original image can be acquired for data reduction by vector quantizing in comparison to the methods of this species previously known.

The object underlying the invention is achieved by a method for data reduction of digital image sequences in hierarchic fashion by means of a multi-stage coder using vector quantizing, and movement compensation, as well as reconstruction of these image sequences by means of a multi-stage decoder, in which an input image signal is represented in a plurality of image signals having different topical or spatial resolution in a known way on the basis of a cascade of L identical low-pass filters having subsequent sub-scanning, whereby the topical resolution and the data volume of the input image signal are respectively reduced by a factor R in horizontal and in vertical direction in every cascade stage and whereby the input image signal is referenced "resolution level L" and the low-pass-filtered image signal having the smallest resolution is referenced "resolution level 0"; the chronologically preceding, reconstructed, movement-compensated image signal is represented in a plurality of image signals having different topical resolution in the same way; the samples of the resolution levels are subdivided into blocks, whereby the "resolution level 0" has the block size "1×1" and, for the following, the block size is horizontally and vertically increased by the factor R with every further resolution level, but a block maximally assumes the block size N×N; beginning with "resolution level 0", corresponding image signals of the input image signal and of the reconstructed, movement-compensated image signal are respectively successively compared to one another, whereby the comparison operations are executed block-by-block; and a switching of the coding mode ensues as soon as the difference between corresponding image signals exceeds a prescribed threshold, whereby, beginning from the current resolution level of the input image signal, the difference to the ensues preceding resolution level of the input image signal is formed, whereby the interpolation is accomplished in multi-stage fashion, and the difference is quantized and produced as an output, as soon as the difference to be formed next exceeds a prescribed threshold, whereby the difference is scalarly quantized in the "resolution level 0" and the difference is vector quantized in all other "resolution levels 1 . . . L".

The method of the invention eliminates the disadvantages attaching to the methods of the prior art using a combination of various sub-optimum VQ techniques such as "multistage" VQ, "sub-band" VQ as well as "mean separated" and "gain/shape" VQ.

The coder to be employed for the method of the invention allows a progressive image formatting from a succession of low-pass filters whose luminance and color components can be quantized in closed fashion in vectors having the dimensions 3 through 24. As a result of the cascaded VQ concept, the statistical dependencies of blocks having a size of 32×32 pixels can be successively used for data reduction. The great statistical dependencies of successive images in image areas having little movement or no movement are taken into consideration by VQ of the movement-compensated image-to-image differences of the sub-bands.

Advantageous improvements of the present invention are characterized by the features recited in the subclaims.

The present invention shall be set forth in detail below with reference to a plurality of figures relating to preferred exemplary embodiments of the present invention.

BRIEF DESCRIPTION OF THE DRAWINGS

FIG. 6 shows a block diagram from which the detailed structure of a last stage of a vector quantizing component of the HMVQ coder proceeds;

FIG. 7 shows a block diagram of a movement analysis unit of the HMVQ coder;

FIG. 15 shows a fundamental view of a two-pass block overlap interpolation in the framework of the method of the invention;

FIG. 16 shows a fundamental, overall view of the hierarchic, multi-level vector quantizing in the framework of the HMVQ method of the present invention.

DESCRIPTION OF THE PREFERRED EMBODIMENTS

Figure 1:
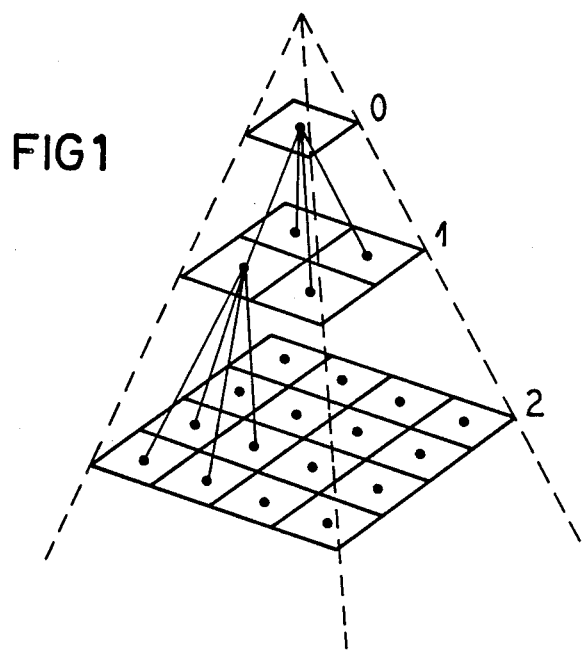
FIG. 1 shows a schematic illustration of a pyramid-shaped resolution structure having a plurality of levels 0 . . . 2 from which the manner in which the degree of resolution of an image or of an image block is varied from level to level proceeds, whereby the greatest resolution of the image or image block is present in level 2 in the said illustration. (A comparable resolution modification diagram is already known from IEEE Transactions on Computers, Volume C-28, No. 11, November 1979, pages 871 ff, "Progressive Refinement of Raster Images")
Figure 2:
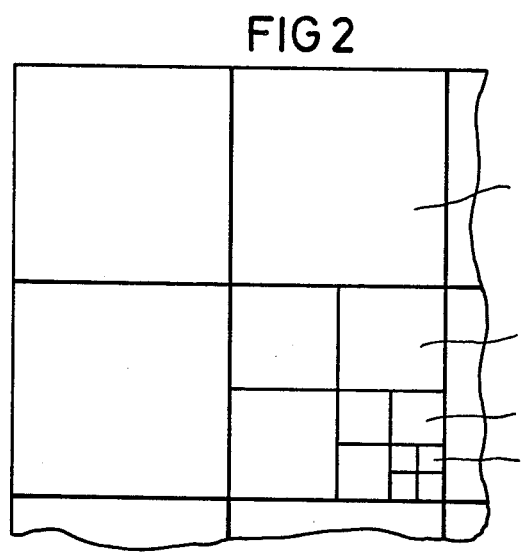
FIG. 2 shows a schematic illustration of the subdivision of an image given application of the hierarchic, multi-stage vector quantizing method HMVQ of the invention according to a preferred exemplary embodiment of the present invention whereby the plurality of samplings to be respectively applied is recited for levels 0 . . . 5.

FIG. 1 shows a pyramid-shaped, schematic illustration having a plurality of levels 0 . . . 2 from which the manner in which the various resolutions of the image or image block are executed proceeds. As likewise already explained, FIG. 2 shows a further schematic illustration from which how an image or image block is to be differently resolved in a plurality of levels according to the present invention proceeds.

Figure 3:
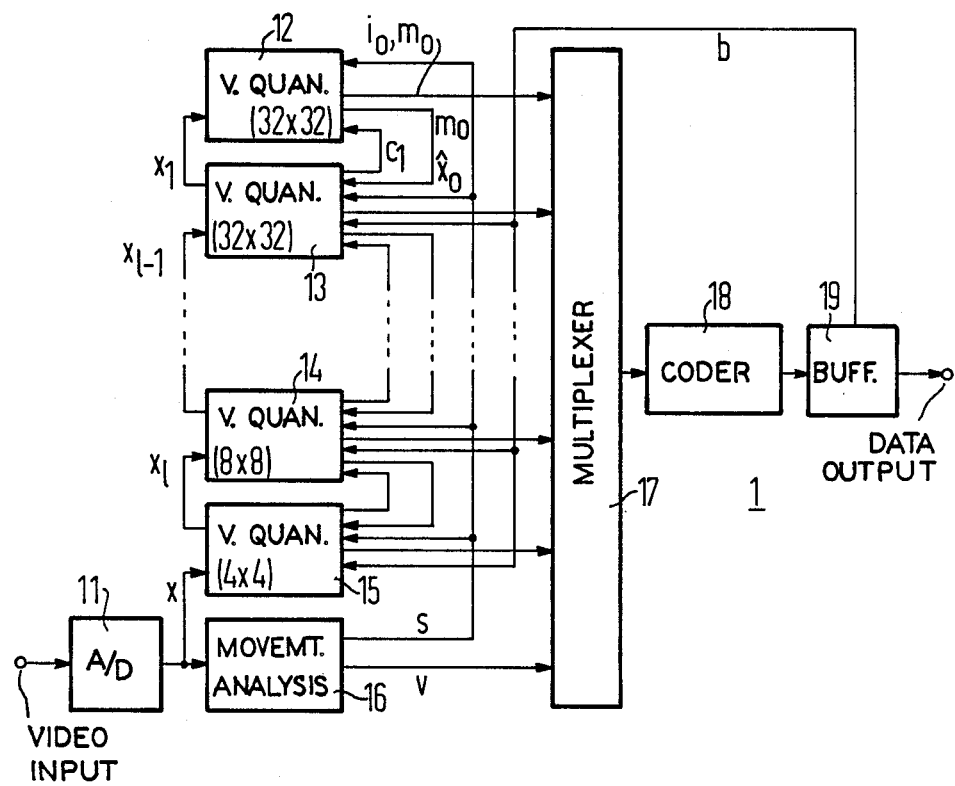
FIG. 3 shows a block circuit diagram of an inventive coder for the HMVQ method.

FIG. 3 shows a block diagram of a coder as employed in the HMVQ method of the invention. This block diagram, that merely represents a preferred exemplary embodiment, shows a terminal "video input" that is connected to an A/D converter 11. The output of the A/D converter 11 is connected, first, to a signal input of a last VQ stage (vector quantizing stage) 15 and, second, to the input of a movement analysis unit 16. Together with a first VQ stage 12 and a plurality of intermediate VQ stages 13 . . . 14, the last VQ stage 15 forms a vector quantizing arrangement that is interconnected cascade-like. A signal x is supplied to the afore-mentioned signal input of the last VQ stage 15 from the A/D converter 11. An output of the last VQ stage 15 outputs a signal $x_l$, this signal $x_l$ being supplied to a signal input of an intermediate VQ stage 14. An output of this intermediate VQ stage 14 outputs a signal $x_{l-1}$ that is supplied to a further intermediate VQ stage 13 within this cascade-like arrangement. An output of this intermediate VQ stage 13, finally, supplies a signal $x_1$ to an input of a first VQ stage 12. Via a first output, the movement analysis unit 16 outputs a signal s to a respectively further input of all of the said VQ stages 12 . . . 15. A respectively first output of the last VQ stage 15, of the intermediate VQ stage 14 . . . , and of the further intermediate VQ stage 13 outputs a signal c to a further input of the VQ stage respectively preceding in the cascade. A further respective output of the VQ stages 12 . . . 14 outputs an output signal m, x to a further input of the VQ stage 13 . . . 15 respectively following in the cascade. A signal b, namely what is referred to as a buffer control signal, that is output from a buffer memory 19 is supplied to a further respective signal input of the VQ stages 13 . . . 15. Finally, a result signal i, m or, respectively, v is output via a further respective output of all VQ stages 12 . . . . 15 and of the movement analysis unit 16, being output to a respective signal input of a multiplexer 17. The output of the multiplexer 17 is connected to a coder 18 whose output is connected to the afore-mentioned buffer memory 19. The output of the buffer memory 19 is connected to a terminal "data output".

Figure 4:
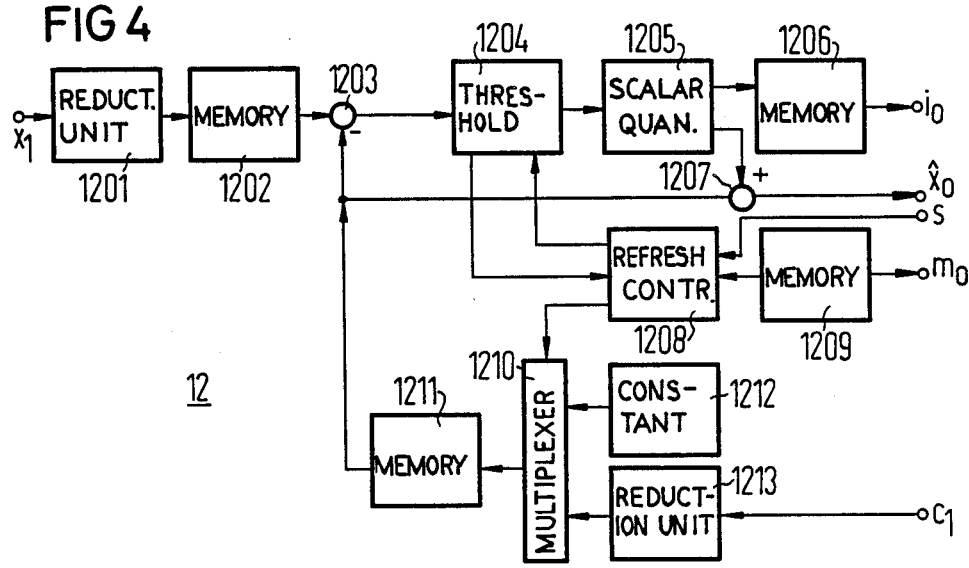
FIG. 4 shows a block circuit diagram from which the detailed structure of a first stage of a vector quantizing component of the HMVQ coder proceeds.

FIG. 4 shows a detailed block diagram of the first VQ stage 12. As may be seen, the input $x_1$ of this circuit arrangement is supplied to a reduction unit 1201, whose output is connected to a memory 1202. The output of this memory 1202 is connected to one of two signal inputs of a subtraction element 1203. The output of this subtraction element is connected to the input of a threshold circuit 1204 whose one output is connected to a scalar quantizer 1205. An output of this scalar quantizer 1205 is connected to the input of a further memory 1206 whose output is connected to a terminal $i_0$. A further output of the scalar quantizer 1205 is connected to one of two inputs of an addition element 1207. The output of this addition element 1207 is connected to a terminal $x_0$. A further output of the threshold circuit 1204 is connected to a first input of a refresh control unit 1208. A second input of this refresh control unit 1208 is supplied with an input signal via a terminal s. A further memory 1209, whose output is connected to a terminal $m_0$, is connected to a further input of the refresh control unit 1208. A first output of the refresh control unit 1208 is connected to a second input of the threshold circuit 1204, and a second output of the refresh control unit 1208 is connected to a control input of a multiplexer 1210. Via one input, the multiplexer 1210 is supplied with a signal from a constant unit 1212 and, via a further input, is supplied with a signal from a further reduction unit 1213, this latter being supplied with a control signal via a terminal $c_1$. The output of the multiplexer 1210 is connected to a further memory 1211 whose output is conducted to a second input of the subtraction element 1203 to which a second input of the addition element 1207 is also connected.

Figure 5:
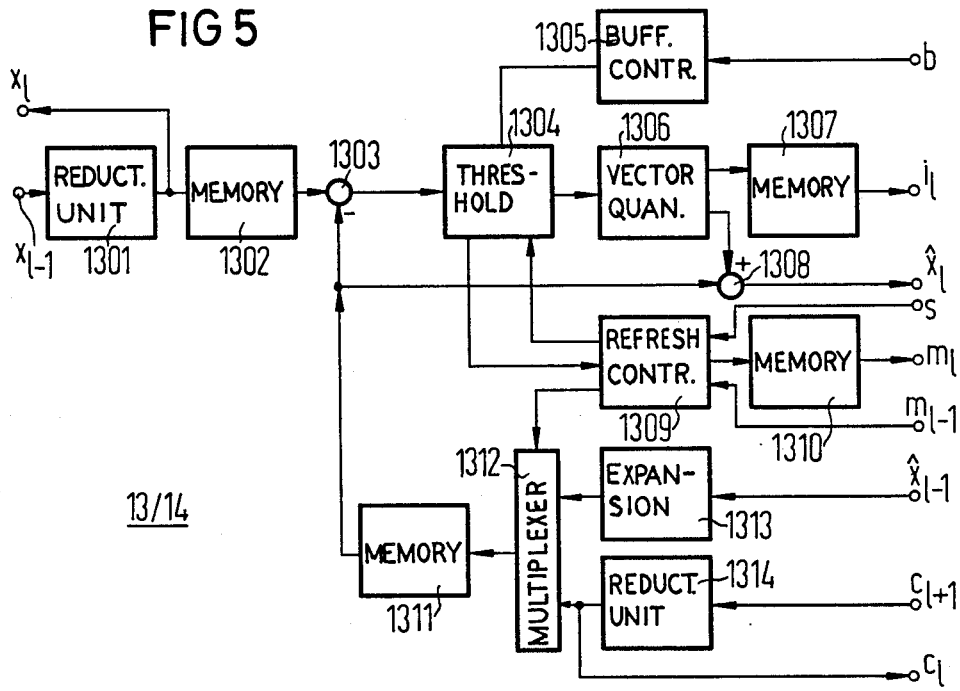
FIG. 5 shows a block circuit diagram from which the detailed structure of an intermediate stage of a vector quantizing component of the HMVQ coder proceeds.

As likewise already explained, FIG. 5 shows a block diagram from which the detailed structure of an intermediate stage 13 or, respectively, 14 of a vector quantizing component of the HMVQ coder proceeds. This intermediate stage contains a reduction unit 1301, a memory 1302, a subtraction element 1303, a threshold circuit 1304, a buffer control unit 1305, a vector quantizer 1306, a further memory 1307, an addition element 1308, a refresh control unit 1309, a further memory 1310, a further memory 1311, a multiplexer 1312, an expansion unit 1313, as well as a further reduction unit 1314. The structure of this intermediate stage is essentially the same as the structure of the first stage set forth above, but with the following exceptions: a signal line that leads to a post $x_l$ is connected between the reduction unit 1301 and the memory 1302; in comparison to the corresponding threshold circuit of the first stage, the threshold circuit 1304 comprises a control input via which a control signal is supplied from the buffer control unit 1305, this control signal being capable of modifying the threshold of the threshold circuit dependent on the filling ratio of the buffer; the buffer control unit 1305 is supplied with a control signal via a terminal b, the refresh control unit 1309 that corresponds to the refresh control unit 1208 in FIG. 4 is additionally supplied with a control signal via a post $m_{l-1}$; instead of the constant unit 1212 in FIG. 4, the expansion unit 1313 to which a control signal is supplied via the post $x_{-1}$ is provided for the intermediate stage 13 or, respectively, 14; finally, compared to the circuit arrangement for the first stage, an additional signal output is provided in the intermediate stage 13 or, respectively, 14, this additional signal output being connected to the output of the further reduction 1314 and leading to a terminal $c_l$.

As already explained, FIG. 6 shows a block diagram from which the detailed structure of a last stage 15 of a vector quantizing component of the HMVQ coder proceeds. This circuit arrangement comprises a subtraction element 1501, a threshold circuit 1502, a buffer control unit 1503, a vector quantizer 1504, a memory 1505, an addition element 1506, a refresh control unit 1507, a further memory 1508, a further memory 1509, a multiplexer 1510, an expansion unit 1511, a movement compensation unit 1512, and an image block memory 1513. The circuit arrangement for this last stage 15 is essentially identical to the circuit arrangement for the intermediate stage 13 or, respectively, 14, but with the following exceptions: the subtraction element 1501 has neither a reduction nor a memory preceding it but is directly connected to a terminal x. Instead of being provided with the further reduction unit 1314 as shown in FIG. 5, the last stage according to FIG. 6 is provided with an arrangement that is composed of a series circuit of the image block memory 1513 and the movement compensation unit 1512; the movement compensation unit has a side input that is connected to a terminal v; the image block memory 1513 is connected to the output of the addition element 1506, in contrast whereto the output of the corresponding addition element 1305 according to FIG. 5 is connected to a post $x_l$.

As likewise already explained, FIG. 7 shows a block diagram of a movement analysis unit of the HMVQ coder. The movement analysis unit contains a multiplexer 71, an image block memory 72, a further image block memory 73, a switch unit 74, a movement segmenting unit 75, a memory 76, a block matching unit 77, as well as a further memory 78. Via a terminal x, the multiplexer 71 is supplied with an input signal that is optionally transmitted by the outputs of the multiplexer onto the first image block memory 72 or onto the second image block memory 73. The output of the first image block memory 72 is connected to a first input of the switch unit 74, and the output of the second image block memory 73 is connected to a second input of the switch unit 74. A first output of the switch unit 74 is connected both to a first input of the movement segmenting unit 75, to a first input of the block matching unit 77, as well as to an output terminal x.

A second output of the switch unit 74 is connected both to a second input of the movement segmenting unit 75 as well as to a second input of the block matching unit 77. The output of the movement segmenting unit 75 is connected to the input of the memory 76, and the output of the block matching unit 77 is connected to the input of a further memory 78. Finally, the output of the first memory 76 is connected to an output terminal s and the output of the second memory 78 is connected to an output terminal v.

Figure 8:
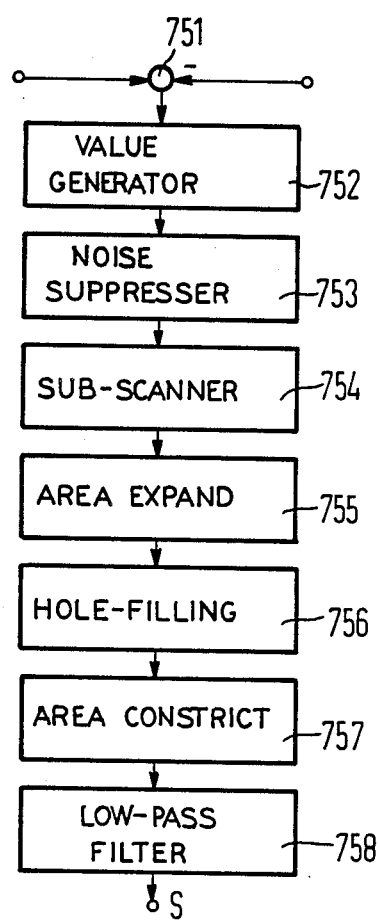
FIG. 8 shows a schematic illustration of a function execution for a moving/still segmenting according to the method of the invention.

As already explained, FIG. 8 shows a schematic illustration as a function execution for a moving/still segmenting according to the method of the invention as is executed in the movement segmenting unit 75 within th movement analysis unit. The movement segmenting unit 75 contains a subtraction element 751, a unit 752 for forming binary values, a noise-suppressing unit 753, a sub-scanning unit 754, an area-expanding unit 755, a hole-filling unit 756, an area-constricting unit 757, and a low-pass filter 758. The subtraction element 751 is supplied with the signal of the momentary image via a first signal input and is supplied with the signal of the appertaining, preceding image via a second signal input. The signal output of the subtraction element 751 is conducted to the input of the unit 752 for forming binary values. The output of the unit 752 for forming binary values is connected to the input of the noise-suppressing unit 753 whose output is connected to the input of the sub-scanning unit 754. The output of the sub-scanning unit 754 is connected to the input of the area-expanding unit 755 whose output is conducted to the input of the hole-filling unit 756. The output of this hole-filling unit 756 is connected to the input of the area-constricting unit 757 whose output is connected to the input of the low-pass filter 758. Finally, the output signal of the low-pass filter, namely the segmenting mask signal s is carried off via a terminal s.

Figure 9:
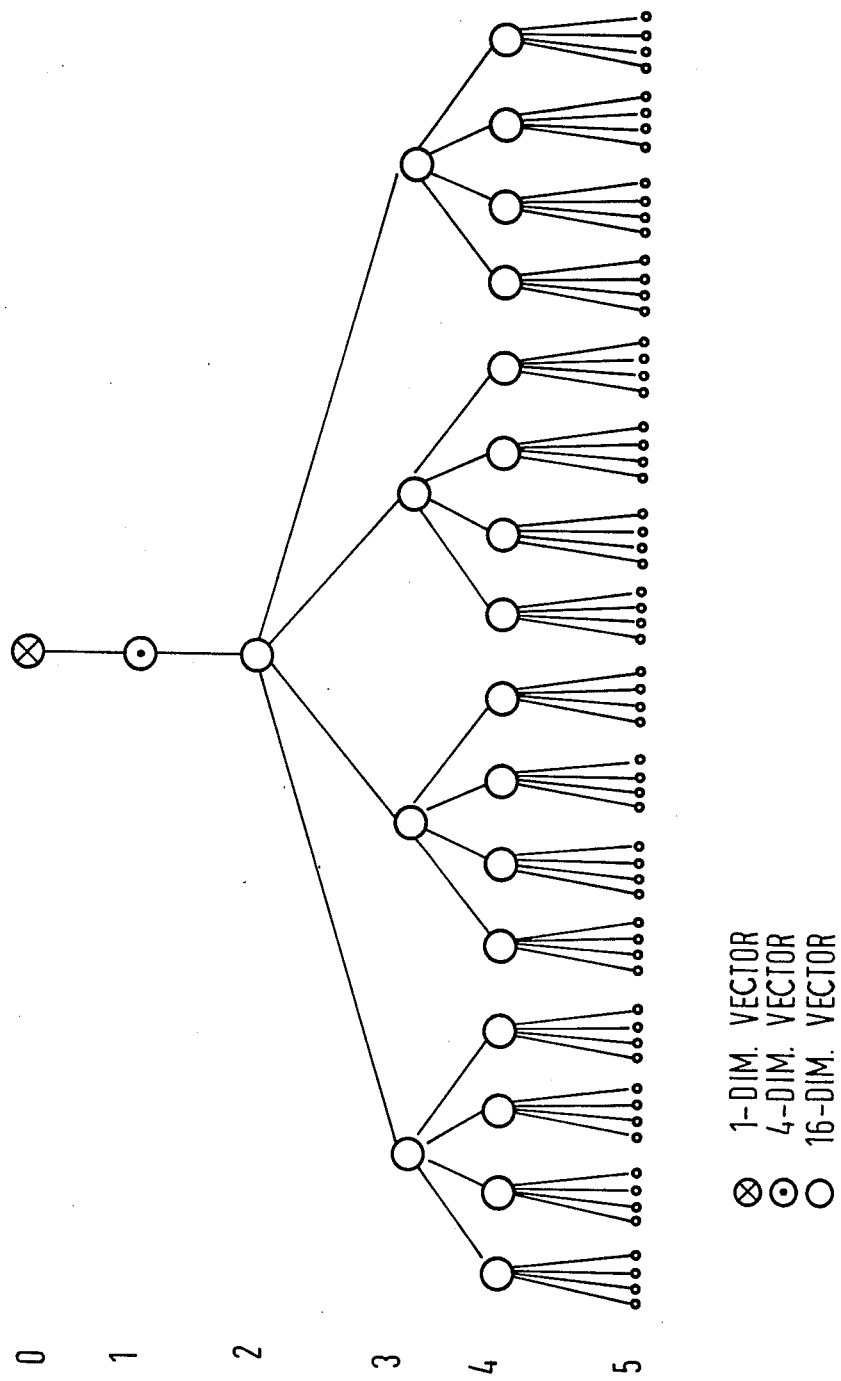
FIG. 9 shows a schematic structure similar to a selection tree having six hierarchy levels 0 . . . 5 that represent the data structure of a 32×32 pixel block in the framework of the HMVQ method.

As already explained, FIG. 9 shows a schematic structure similar to a selection tree that has six hierarchy levels 0 . . . 5 that represent a data structure of a 32×32 pixel block in the framework of the HMVQ method.

Figure 10:
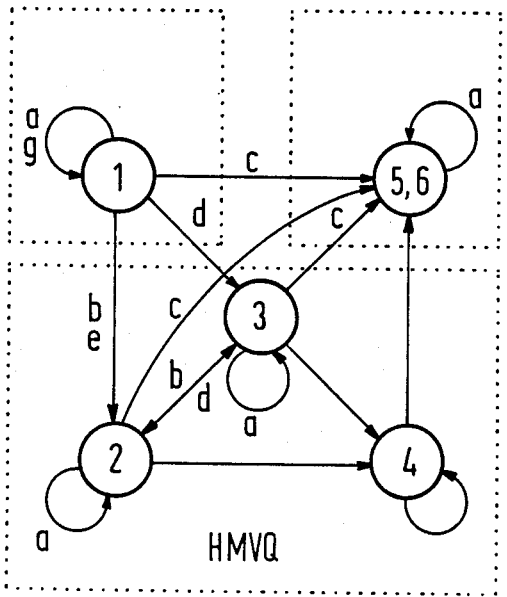
FIG. 10 shows an explanatory illustration of the relationships of the various coder modes and their transitions.

As likewise already explained FIG. 10 shows an explanatory illustration of the relationships of the various coding modes and their transitions. The corresponding transition codes a, b, c, d, e, f and g have the respective shapes 0, 10, 110, 1110, 11110, 111110 or, respectively, 111111, whereby the last three codes, namely e=11110, f=111110 and g=111111 represent what are referred to as stop codes.

Figure 11:
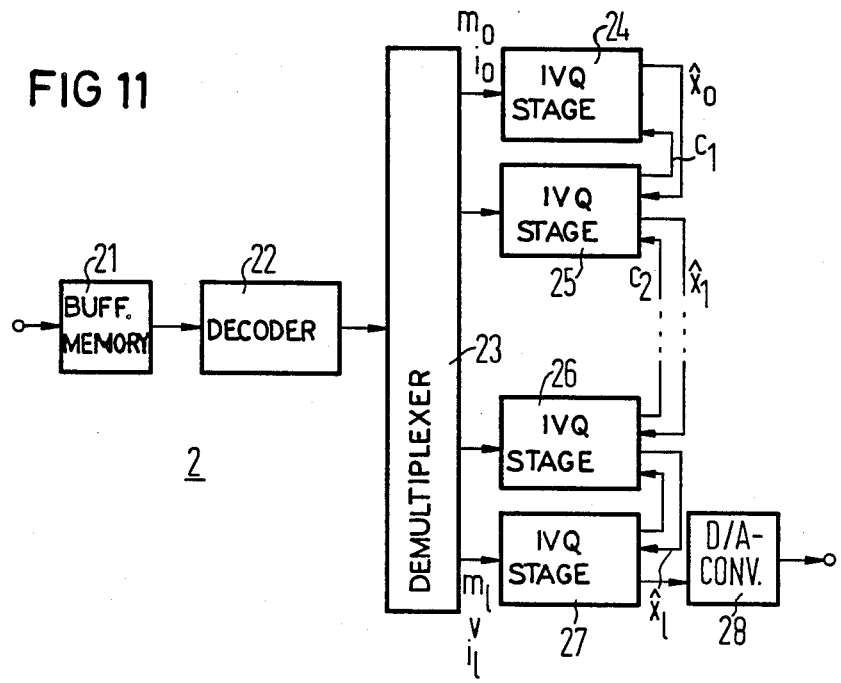
FIG. 11 shows a block diagram of a HMVQ decoder that can be used for the method of the invention.

As already explained, FIG. 11 shows a block diagram of a HMVQ decoder 2 employable for the method of the invention. The decoder 2 contains a buffer memory 21, a decoder 22, a demultiplexer 23, a first IVQ stage 24, a plurality of intermediate IVQ stages 25 . . . 26, the last IVQ stage 27 and a D/A converter 28. Entering data are supplied to the input of the buffer memory 21 that is connected to a terminal "data input". The output of the buffer memory 21 is connected to the input of the decoder 22 whose output is connected to the input of the demultiplexer 23. A first output of the demultiplexer 23 is connected to the first IVQ stage 24; a third output of the demultiplexer 23 is connected to a first intermediate IVQ stage 25; a third output of the demultiplexer 23 is connected to the last intermediate IVQ stage 26 provided in the cascade-like arrangement of IVQ stages; and a fourth output of the demultiplexer 23 is connected to the input of the last IVQ stage 27. The output of the first IVQ stage 24 is connected to a further input of the intermediate IVQ stage 25, whereas an output of this intermediate IVQ stage 25 is connected to a further input of the further intermediate IVQ stage 26. An output of this latter intermediate IVQ stage 26 is connected to a further input of the last IVQ stage 27. A further output of the intermediate IVQ stage 25 cited first is connected to a further input of the first IVQ stage 24, whereas a further output of the intermediate IVQ stage 26 cited last is connected to a further input of the intermediate IVQ stage 25 cited first and a first output of the last IVQ stage 27 is connected to a further input of the intermediate IVQ stage 26 cited last. A second output of the last IVQ stage 27 is connected to the input of the D/A converter 28 whose output is connected to a terminal "video output".

Figure 12:
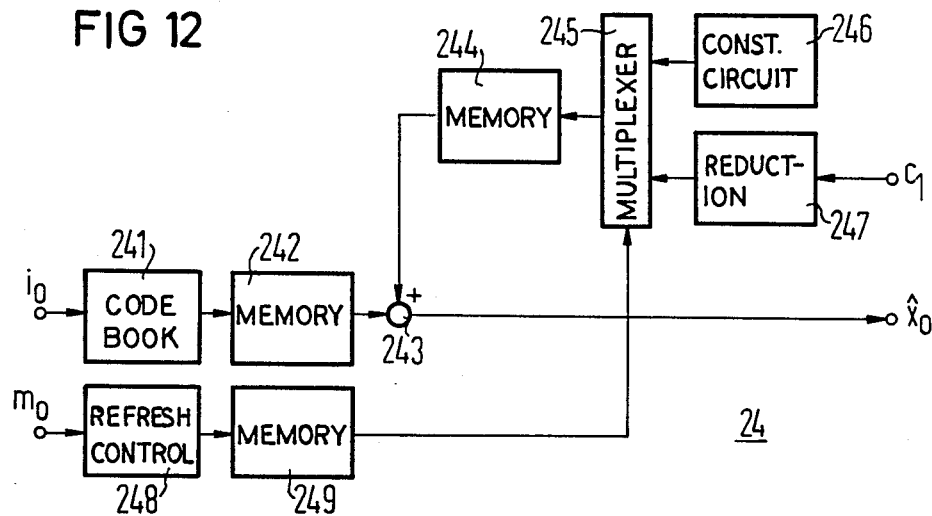
FIG. 12 shows a block diagram of a first stage of a reconstruction unit of the HMVQ decoder.

As already explained, FIG. 12 shows a block diagram of a first stage 24 of a reconstruction unit of the HMVQ decoder. This first stage 24 contains a code book 241, which may be a ROM or a PROM, a memory 242, an addition element 243, a further emory 244, a multiplexer 245, a constant circuit 246, a reduction unit 247, a refresh control unit 248, and a further memory 249. An input signal is supplied to the code book 241 via a terminal $i_0$. An output signal of the code book is supplied to the input of the memory 242. The output of this memory 242 is connected to a first input of the addition element 243 whose second input is connected to the output of the further memory 244. The further memory 244 is supplied with an output signal of the multiplexer 245. An output of the constant circuit 246 is connected to a first input of this multiplexer 245, whereas an output of the reduction unit 247 that is supplied with a control signal from a post $c_1$ is connected to a further input of the multiplexer 245. The output signal of the addition element 243 is applied to a post $x_0$. A signal that is applied to a terminal $m_0$ is connected to the input of the refresh control unit 248 whose output is connected to the input of the further memory 249. Finally, the output of this further memory 249 is connected to a control input of the multiplexer 245.

Figure 13:
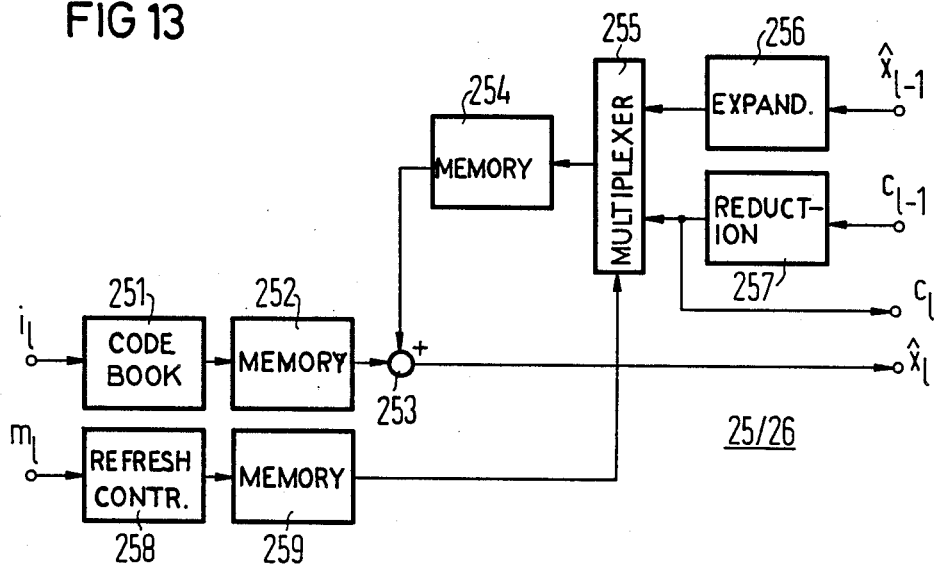
FIG. 13 shows a block diagram of an intermediate stage of the reconstruction unit of the HMVQ decoder.

As already explained, FIG. 13 shows a block diagram of an intermediate stage 25 or, respectively, 26 of the reconstruction unit of the HMVQ decoder. These intermediate stages 25 and, respectively, 26 each contain a code book 251, a memory 252, an addition element 253, a further memory 254, a multiplexer 255, an expansion unit 256, a reduction unit 257, a refresh control unit 258, and a further memory 259. The structure of this intermediate stage is essentially the same as that of the first stage according to FIG. 12 but with the exception that the expansion unit 256 that is supplied with a control signal via a terminal $X_{l-1}$ is provided instead of the constant circuit 246 in FIG. 12 as well as that, differing from the circuit arrangement of FIG. 12, an output signal that is supplied to a terminal $c_l$ is carried off at the output of the reduction unit 257.

Figure 14:
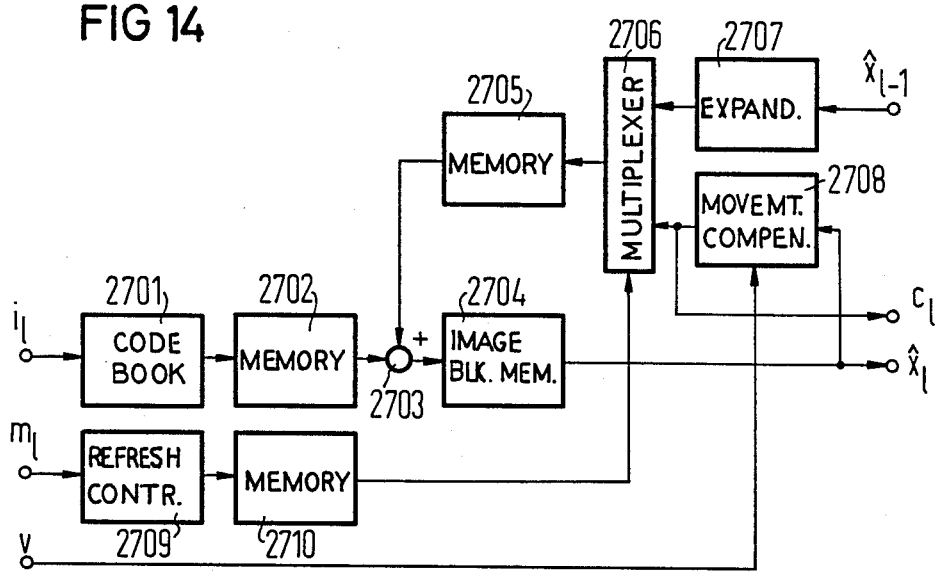
FIG. 14 shows a block diagram of a final stage of the reconstruction unit of the HMVQ decoder.

As already explained, FIG. 14 shows a block diagram of a final stage 27 of the reconstruction unit of the HMVQ decoder. This final stage 27 contains a code book 2701, a memory 2702, an addition element 2703, an image block memory 2704, a further memory 2705, a multiplexer 2706, an expansion unit 2707, a movement compensation unit 2708, a refresh control unit 2709, and a further memory 2710. The code book 2701 is supplied with an input signal via a terminal $i_l$, and an output signal of the code book 2701 is supplied to the input of the memory 2702. The output of the memory 2702 is connected to a first input of the addition element 2703 whose second input is connected to the output of the further memory 2705. The output of the addition element 2703 is connected to the input of the image block memory 2704, whereas the output of the image block memory 2704 is connected, first, to an output post $x_l$, and, second, to an input of the movement compensation unit 2708. The output of the movement compensation unit 2708 is connected to a first input of the multiplexer 2706 and to an output post $c_l$. An output of the expansion unit 2707 whose input is connected to an input post $x_{l-1}$ is connected to a second input of the multiplexer 2706. The output of the multiplexer 2706 is connected to the input of the further memory 2705. The refresh control unit 2709 is supplied with a control signal via an input terminal $m_l$, whereas the output of this refresh control unit 2709 is connected to the input of the further memory 2710. The output of this further memory 2710 is connected to a side or: page input of the multiplexer. Finally, a further input terminal v is connected to a control input of the movement compensation unit 2708.

As already explained, FIG. 15 shows a fundamental illustration of a two-pass block overlap interpolation in the framework of the method of the invention. As may be seen in the upper part of FIG. 15, a function step "expand" contains a step for interpolating that is followed by a step for reducing. The step of reducing is followed by a step for subtracting that is followed by a further step for interpolating. A step for multiplying by two is provided parallel to the steps for initial interpolating and reducing, whereby the multiplication result is processed in the step for subtacting together with the reduction result from the step for reducing. The functions for reducing or, respectively, for interpolating are schematically shown in the lower part of FIG. 15.

As already explained, FIG. 16 shows a fundamental overall view of the hierarchic, multi-stage vector quantizing in the framework of the HMVQ method of the present invention. The left-hand part of this figure shows the functions as they are executed in the coder, whereas the right-hand part of the figure shows the functions or, respectively, function blocks as executed or, respectively, provided in the decoder.

In conclusion, let the advantageous properties of the method of the invention be recited:

1. Progressive image formatting is performed.
2. The are no "blocking" effects (block-overlapping method), and artifacts are limited to 4×4 pixel.
3. The worst-case picture quality (100% movement) corresponds to the low-pass-filtered image with $f_g = \frac{1}{8} f_o$, where $f_g$ denotes the limit frequency and $f_o$ denotes the highest frequency occurring in the original image.
4. Movement compensation corresponds to exactly 4×4 pixel, with a 16×16 block-matching algorithm.
5. The image resolution is controlled by a central moving/still calculation, with noise elimination.
6. A simple filter structure is used (sampling via mean value calculation, with interpolation via FIR (Finite Impulse Respond) filters having 6 coefficients.
7. Cascaded vector quantizing is performed with small code books.
8. Closed quantizing of YUV is performed.
9. Closed coding of the control information of the progression levels is performed by a "top-down/bottom-up quad-tree" coding.
10. Easily decodable codes are used (maximum code word length=3 bits).
11. A simple receiver structure is used.

It will be apparent that various modifications and/or additions may be made in the apparatus of the invention without departing from the essential feature of novelty involved, which are intended to be defined and secured by the appended claims.

We claim:

1. A method for data reduction of digital image sequences in hierarchic fashion by means of a multi-stage coder on the basis of vector quantizing and movement compensation as well as reconstruction of these image sequences by means of a multi-stage decoder, comprising the steps of representing an input image signal in a plurality of image signals having different spatial resolution on the basis of a cascade of L identical quantizers having subsequent sub-scanning, whereby the spatial resolution and the data volume of the input image signal are respectively reduced by a factor R in the horizontal and in the vertical directions in every cascade stage and whereby the input image signal is referenced "resolution level L" and the low-pass-filtered image signal having the smallest resolution is referenced "resolution level 0";

representing the chronologically preceding, reconstructed, movement-compensated image signal by a plurality of image signals having different spatial resolution in the same way;

subdividing the samples of the resolution levels into blocks, whereby the "resolution level 0" has the block size "1×1" and, for the following, the block size is horizontally and vertically increased by the factor R with every further size N×N;

successively comparing, beginning with "resolution level 0", corresponding image signals of the input image signal and of the reconstructed, movement-compensated image signal, with each other, the said comparison being executed block-by-block;

switching the coding mode as soon as the difference between corresponding image signals exceeds a prescribed threshold, and forming, beginning from the current resolution level of the input image signal, the difference from the interpolated, preceding resolution level of the input image signal, whereby the interpolation is performed in multi-stage fashion, and the difference is quantized and produced as an output as soon as the difference to be formed next exceeds a prescribed threshold, whereby the difference is scalarly quantized in the "resolution level 0" and the difference is vector quantized in all other "resolution levels 1 ... L".

2. The method according to claim 1, characterized in that the prescribed threshold (1304, 1502) is variable with the filling ratio of a buffer memory (1305, 1503).

3. A circuit arrangement for the implementation of the method according to claim 1 or 2, characterized in that the plurality of intermediate stages (13 ... 14; 25 ... 26) contained n the cascade (12, 13 ... 14, 15; 24, 25 ... 26, 27) amounts to two stages.

4. A circuit arrangement for the implementation of the method according to claim 1 or 2, characterized in that the plurality of intermediate stages (13 ... 14; 25 ... 26) contained in the cascade (12, 13 ... 14, 15; 24 ... 25, 26, 27) amounts to at least three.

5. A circuit arrangement for the implementation of the method according to claim 1 or 2, characterized in that the coder (1) contains a movement analysis unit (16) that generates an output signal (s) on the basis of a movement analysis, this output signal being used for controlling the functioning of the vector quantizing stage cascade (12, 13 ... 14, 15).

6. The circuit arrangement according to claim 5, characterized in that the movement analysis unit (16) contains a movement segmenting unit (75) in which the image signals of a momentary image and of an image preceding this momentary image are subtracted from one another (751) and the subtraction result is successively subjected to a binary value formation unit (752), a noise suppression unit (753), a sub-scanning unit (754), an area expansion unit (755), a hole filling unit (756), an area constriction (757) and a low-pass filter in order to generate a segmenting mask signal (s).

7. A circuit arrangement for the implementation of the method according to claim 1 or 2, characterized in that codes from a code book (241) are used for signal components to be transmitted via the channel.

8. A circuit arrangement according to claim 7, characterized in that the code book is realized in the form of a ROM.

9. A circuit arrangement according to claim 7, characterized in that the code book is realized in the form of a PROM.